United States Patent
Birsching et al.

(10) Patent No.: US 8,489,282 B2
(45) Date of Patent: Jul. 16, 2013

(54) ELECTRIC POWER STEERING CONTROL METHODS AND SYSTEMS

(75) Inventors: Joel E. Birsching, Vassar, MI (US); Ashok Chandy, Fenton, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 13/349,154

(22) Filed: Jan. 12, 2012

(65) Prior Publication Data

US 2012/0209473 A1 Aug. 16, 2012

Related U.S. Application Data (60) Provisional application No. 61/443,614, filed on Feb. 16, 2011.

(51) Int. Cl.
*B62D 6/00* (2006.01)

(52) U.S. Cl.
USPC .......................................................... 701/41

(58) Field of Classification Search
USPC ...................... 701/41, 42; 180/446
See application file for complete search history.

(56) References Cited

U.S. PATENT DOCUMENTS

| | | | | |
|---|---|---|---|---|
| 5,182,711 A * | 1/1993 | Takahashi et al. | ............... | 701/41 |
| 5,978,721 A * | 11/1999 | Kagawa et al. | .................. | 701/41 |
| 6,408,234 B1 * | 6/2002 | Wittig | ............... | 701/41 |
| 6,691,818 B2 * | 2/2004 | Endo et al. | ..................... | 180/446 |
| 6,827,177 B2 * | 12/2004 | Asada et al. | ................... | 180/446 |
| 6,876,911 B2 * | 4/2005 | Chen et al. | ......................... | 701/41 |
| 7,374,014 B2 * | 5/2008 | Yasui et al. | .................... | 180/446 |
| 8,046,131 B2 * | 10/2011 | Tanaka et al. | ................... | 701/41 |
| 2007/0062755 A1 * | 3/2007 | Krieger et al. | ................. | 180/446 |
| 2009/0157258 A1 * | 6/2009 | Hales et al. | ...................... | 701/41 |

* cited by examiner

*Primary Examiner* — Mary Cheung
*Assistant Examiner* — Anne Mazzara
(74) *Attorney, Agent, or Firm* — Cantor Colburn LLP (57) ABSTRACT

A control system for controlling a steering system is provided. The control system includes a first module that determines a hysteresis position based on handwheel velocity and handwheel torque. A second module selectively determines an assist curve based on the hysteresis position. A third module generates a final assist command based on the assist curve.

15 Claims, 15 Drawing Sheets

ELECTRIC POWER STEERING CONTROL METHODS AND SYSTEMS

CROSS-REFERENCE TO RELATED APPLICATIONS

This patent application claims priority to U.S. Provisional Patent Application Ser. No. 61/443,614 filed Feb. 16, 2011 which is incorporated herein by reference in its entirety.

FIELD OF THE INVENTION

The present invention relates to methods and systems for controlling a steering system, and more particularly to methods and systems for controlling a steering system using hysteresis compensation.

BACKGROUND OF THE INVENTION

In electric power steering systems, the amount of assist provided is determined based on the driver torque. If friction is low in a system, the assist command will increase and decrease as a driver modulates torque while steering in a corner. This may make it difficult to maintain a constant steer input.

Accordingly, it is desirable to provide for control systems and methods that aid in providing a constant steer input.

SUMMARY OF THE INVENTION

In one embodiment, a control system for controlling a steering system is provided. The control system includes a first module that determines a hysteresis position based on handwheel velocity and handwheel torque. A second module selectively determines an assist curve based on the hysteresis position. A third module generates a final assist command based on the assist curve.

In another embodiment, a method of controlling a steering system is provided. The method includes determining a hysteresis position based on handwheel velocity and handwheel torque, selectively determining an assist curve based on the hysteresis position, and generating a final assist command to the steering system based on the assist curve.

In yet another embodiment, a system in a vehicle is provided. The system includes an electric power steering system. A control module determines a hysteresis position based on handwheel velocity and handwheel torque, selectively determines an assist curve based on the hysteresis position, and generates a final assist command to the electric power steering system based on the assist curve.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIGS. 3-12B are models illustrating exemplary steering control methods and systems in accordance with yet other exemplary embodiments of the invention.

DETAILED DESCRIPTION

The following description is merely exemplary in nature and is not intended to limit the present disclosure, application, or uses. It should be understood that throughout the drawings, corresponding reference numerals indicate like or corresponding parts and features. As used herein the terms module and sub-module refer to an application specific integrated circuit (ASIC), an electronic circuit, a processor (shared, dedicated, or group) and memory that executes one or more software or firmware programs, a combinational logic circuit, and/or other suitable components that provide the described functionality Referring now to FIG. 1, where the invention will be described with reference to specific embodiments without limiting same, an exemplary embodiment of a vehicle 10 including a steering system 12 is illustrated. In various embodiments, the steering system 12 includes a handwheel 14 coupled to a steering shaft 16. In the exemplary embodiment shown, the steering system 12 is an electric power steering (EPS) system that further includes a steering assist unit 18 that couples to the steering shaft 16 of the steering system 12 and to tie rods 20, 22 of the vehicle 10. The steering assist unit 18 includes, for example, a rack and pinion steering mechanism (not shown) that may be coupled through the steering shaft 16 to a steering actuator motor and gearing. During operation, as the handwheel 14 is turned by a vehicle operator, the motor of the steering assist unit 18 provides the assistance to move the tie rods 20, 22 which in turn moves steering knuckles 24, 26, respectively, coupled to roadway wheels 28, 30, respectively of the vehicle 10.

Figure 1:
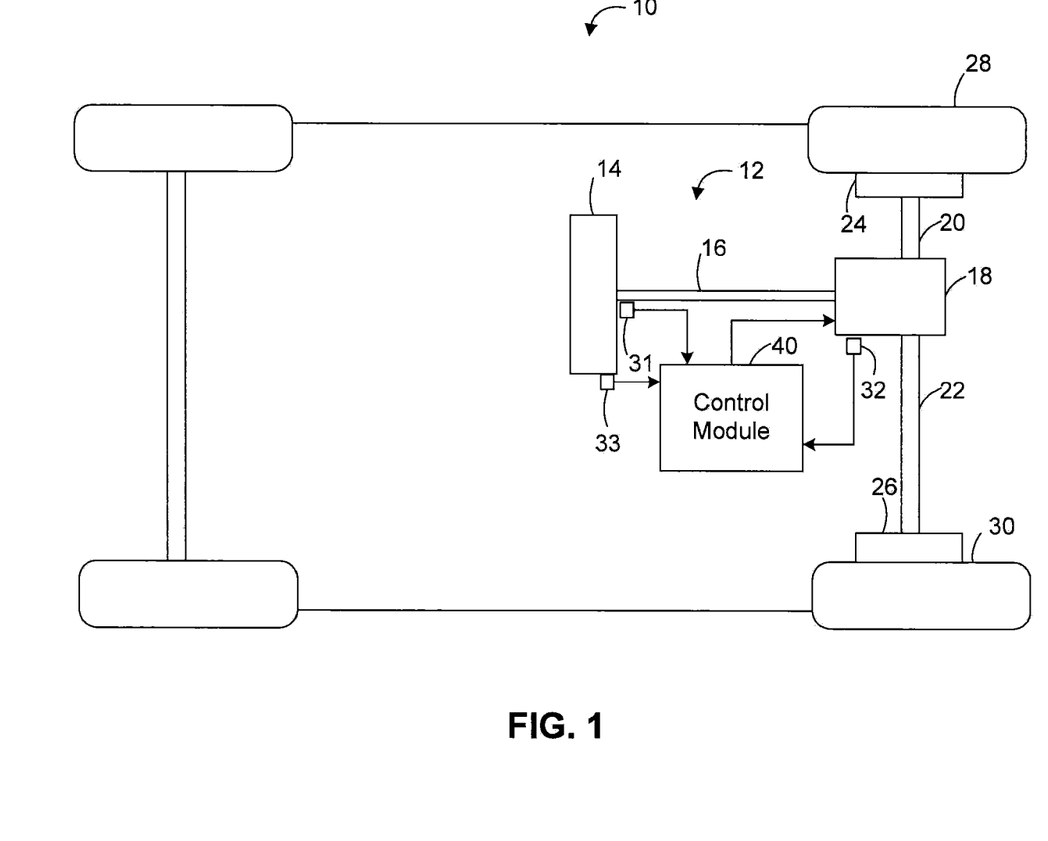
FIG. 1 is a functional block diagram illustrating a vehicle including a steering control system in accordance with an exemplary embodiment of the invention.

As shown in FIG. 1, the vehicle 10 further includes various sensors 31, 32, 33 that detect and measure observable conditions of the steering system 12 and/or of the vehicle 10. The sensors 31, 32, 33 generate sensor signals based on the observable conditions. In the exemplary embodiment shown, the sensor 31 is a torque sensor that senses the torque applied to the handwheel 14 by the operator of the vehicle 10. The torque sensor generates a driver torque signal based thereon. In another example, the sensor 32 is a motor speed sensor that senses a rotational speed of the motor of the steering assist unit. The sensor 32 generates a motor speed or velocity signal based thereon. In yet another example, the sensor 33 is a handwheel position sensor that senses a position of the handwheel. The sensor 33 generates a handwheel position signal based thereon.

A control module 40 controls the operation of the steering system 12 based on one or more of the sensor signals and further based on the steering control systems and methods of the present disclosure. Generally speaking, the steering control systems and methods of the present disclosure use handwheel torque and handwheel velocity to trace a hysteresis loop to improve the ability to maintain a constant assist for a steady state input. The position on the loop is used to determine a position of a desired assist curve between a lower assist curve limit and an upper assist curve limit.

For example, the torque and velocity can be used to determine a direction of the assist modification. At low velocities, the methods and systems can determine the direction of the compensation based on driver torque. At high input velocities, the methods and system can determine the direction based on velocity. This allows the compensation to continue in the direction determined by the velocity, even though the input torque may drop. At intermediate input velocities, the methods and systems can blend between the two methods. To achieve this functionality, the velocity can be converted to an equivalent torque.

Figure 2:
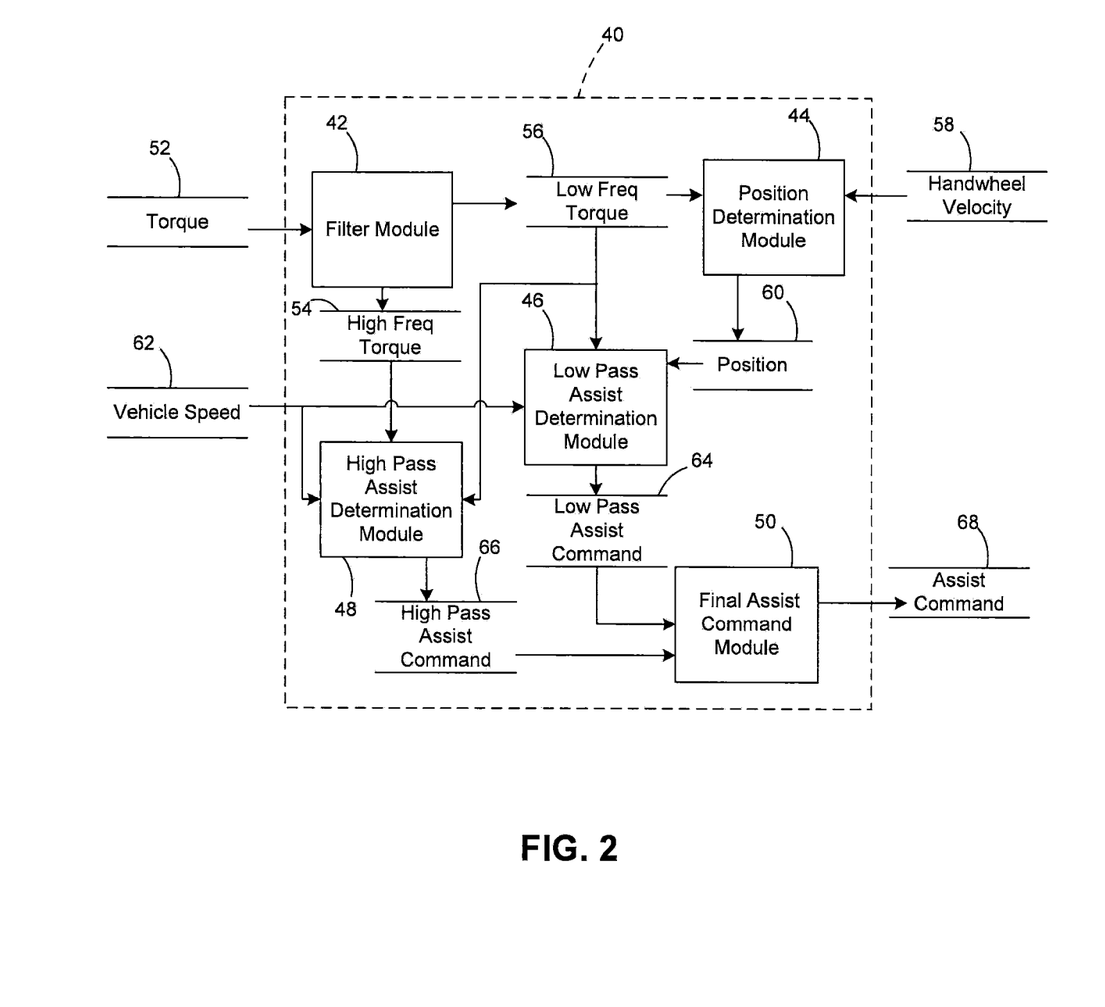
FIG. 2 is a dataflow diagram illustrating a steering control system in accordance with another exemplary embodiment of the invention.

Referring now to FIG. 2, a dataflow diagram illustrates an exemplary embodiment of the control module 40 of FIG. 1 used to control the steering system 12 of FIG. 1. In various embodiments, the control module 40 can include one or more sub-modules and datastores. As can be appreciated, the sub-modules shown in FIG. 2 can be combined and/or further partitioned to similarly generate the assist command signal to the steering system 12 (FIG. 1). Inputs to the control module 40 can be generated from the sensors 31, 32, 33 (FIG. 1) of the vehicle 10 (FIG. 1), can be received from other control modules (not shown) within the vehicle 10 (FIG. 1), can be modeled, and/or can be predefined.

In one example, the control module 40 includes a filter module 42, a hysteresis position determination module 44, a high pass assist determination module 48, a low pass assist determination module 46, and a final assist command module 50.

The filter module 42 receives as input handwheel torque 52. The filter module 42 applies one or more filters to the handwheel torque 52 to determine a high frequency torque 54 and a low frequency torque 56. The filters can be a first order low pass filter, which multiplies the difference between the input to the filter and the previous value of the output of the filter by a coefficient, and adds the result to the previous value of the output of the filter to find the low pass component. The high pass component can be determined by subtracting this value from the input torque. As can be appreciated, these, or any filter known in the art can be used.

The hysteresis position determination module 44 receives as input the low frequency torque 56, and handwheel velocity 58. Based on the inputs 56, 58, the hysteresis position determination module 44 determines a position 60 (e.g., an X, Y coordinate) on a hysteresis loop. An exemplary position determination method is illustrated in FIGS. 3 through 10. For example, in FIGS. 3 and 4 the hysteresis position determination module 44 may determine a delta torque at 100. As shown in FIG. 4, the delta torque may be set equal to the delta torque at low hand wheel speeds; the delta torque may be set to a value that is proportional to the hand wheel velocity at increased hand wheel speeds; and the delta torque may be blended between the two conditions.

Figure 3:
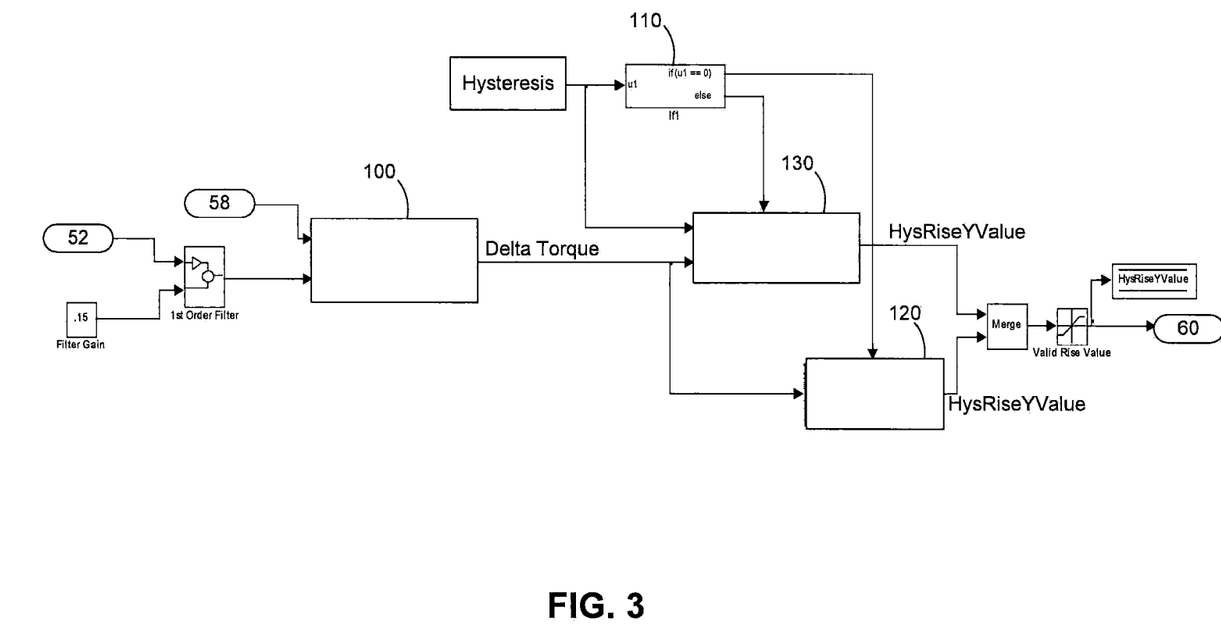
Figure 4:
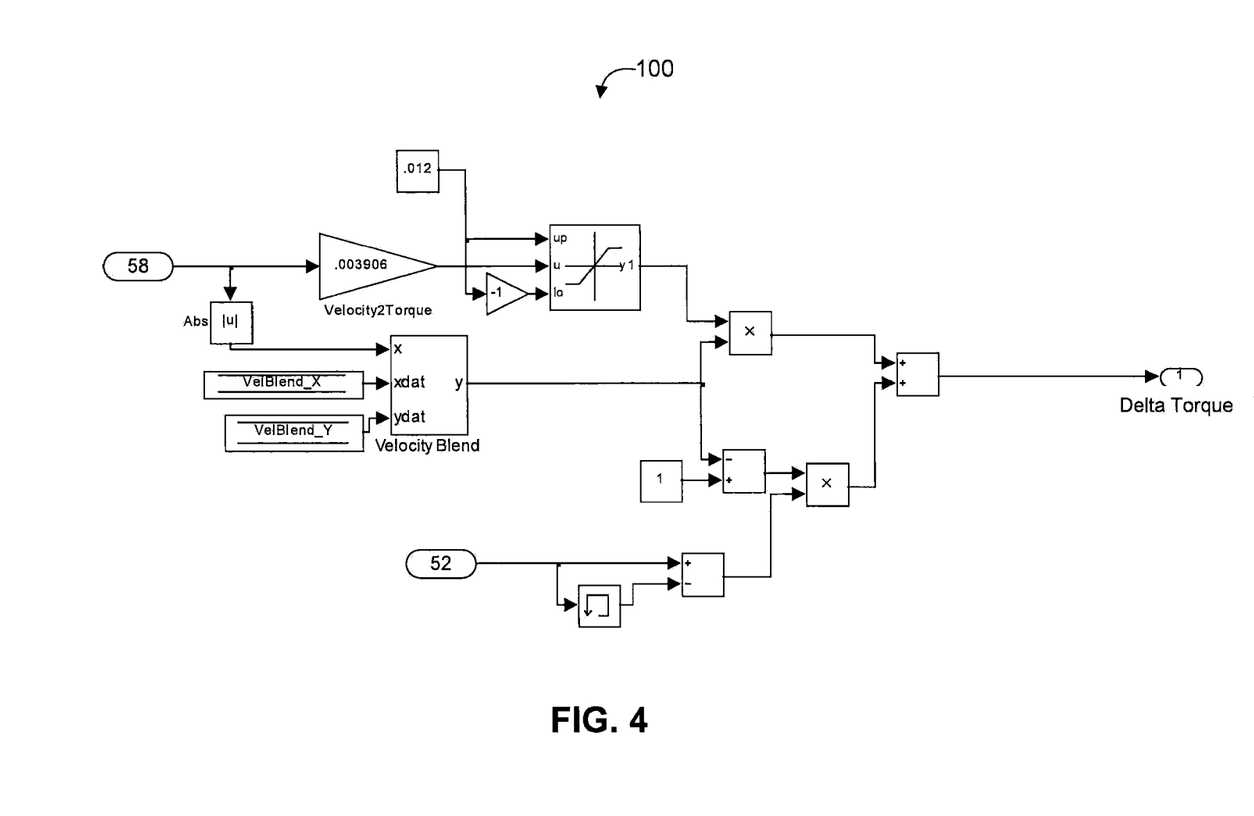
Figure 5:
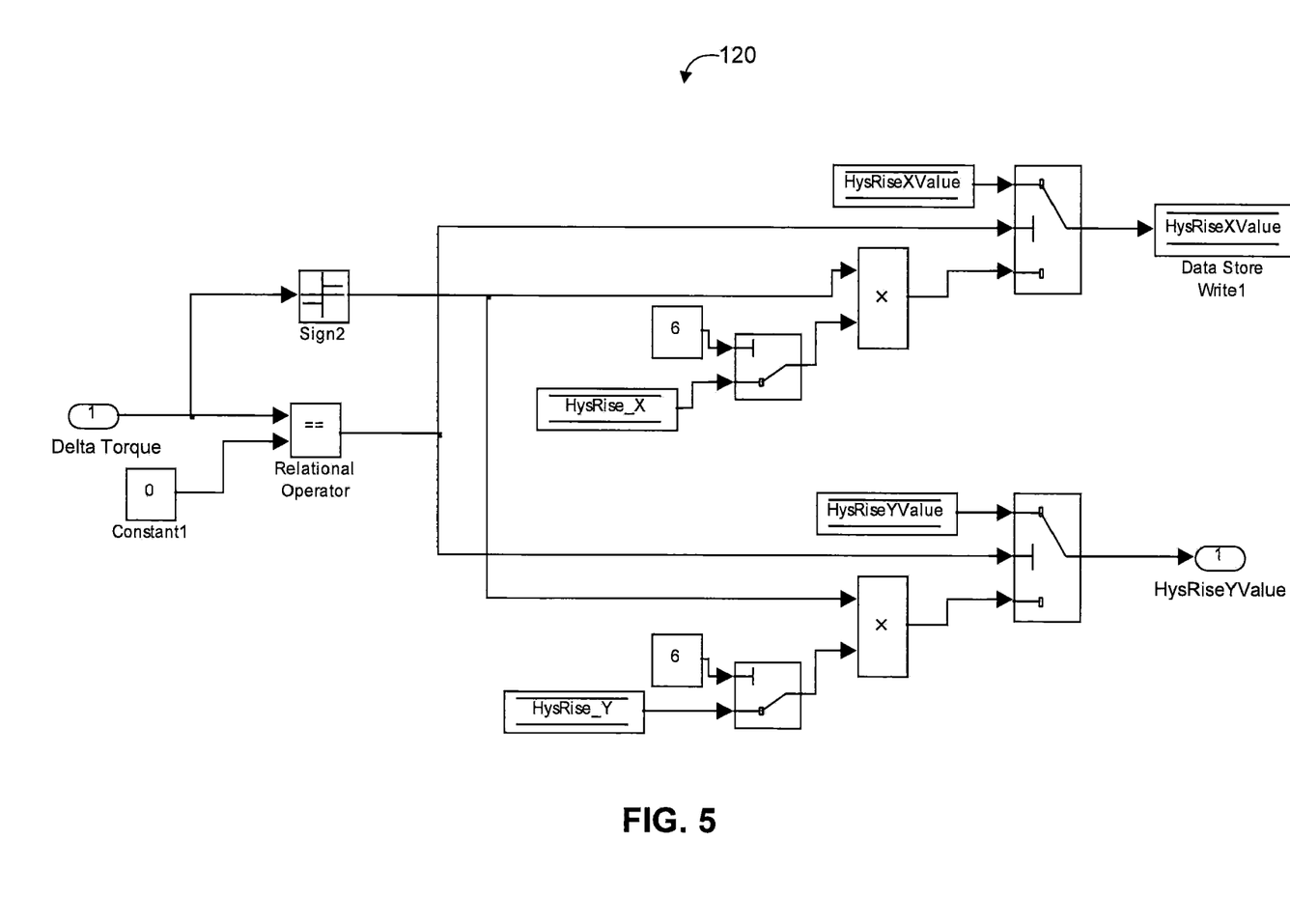

In FIGS. 3 and 5, when the hysteresis is zero, a hysteresis rise value is determined based on the delta torque at 120. As shown in FIG. 5, the hysteresis rise value may be set to a predetermined maximum, for example one, when the delta torque is positive; the hysteresis rise value may be set to a predetermined minimum, for example negative one, when the delta torque is negative; and the hysteresis rise value may be set to the previous value when the delta torque is zero. The hysteresis position is equal to the hysteresis rise value.

Figure 6:
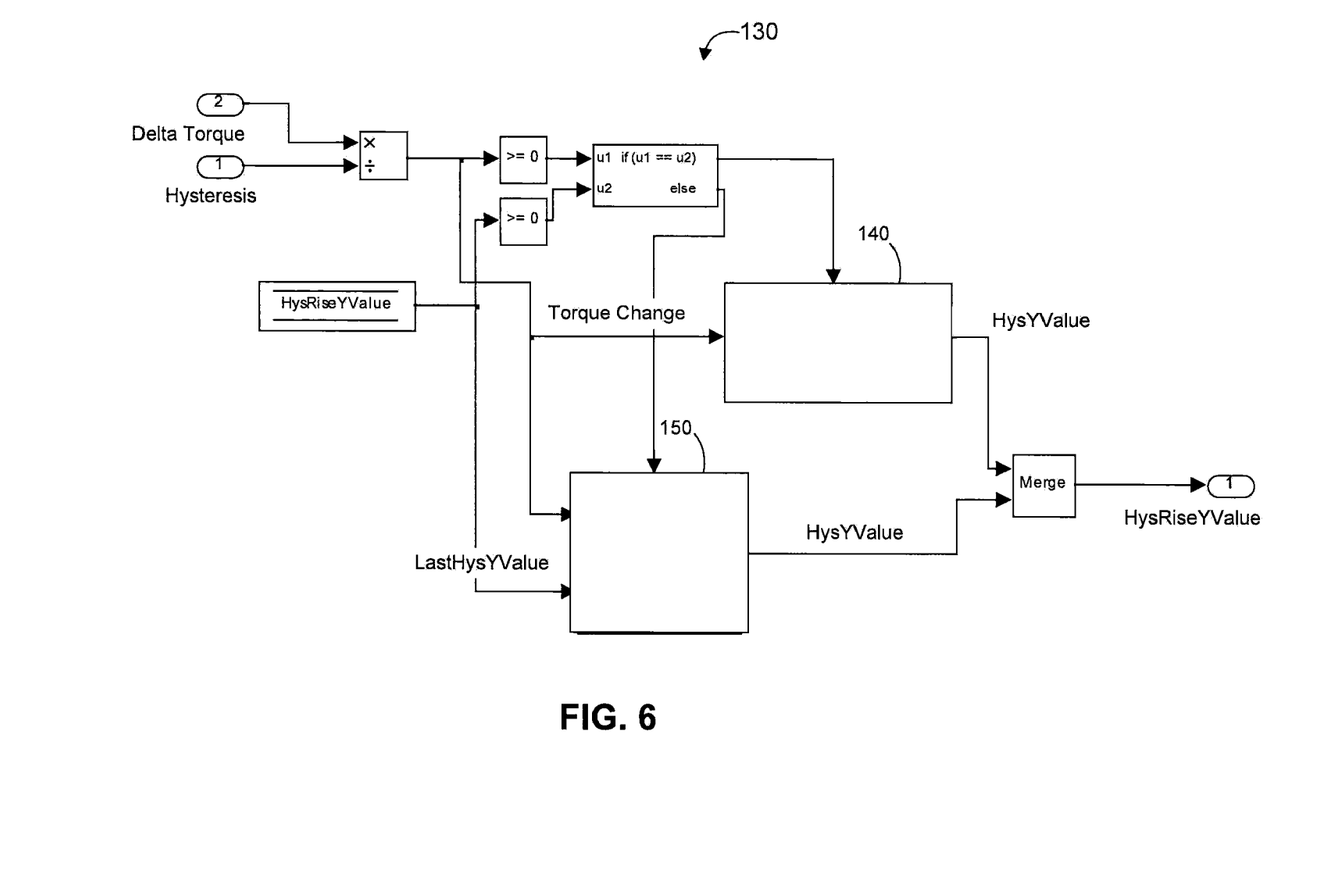
Figure 7:
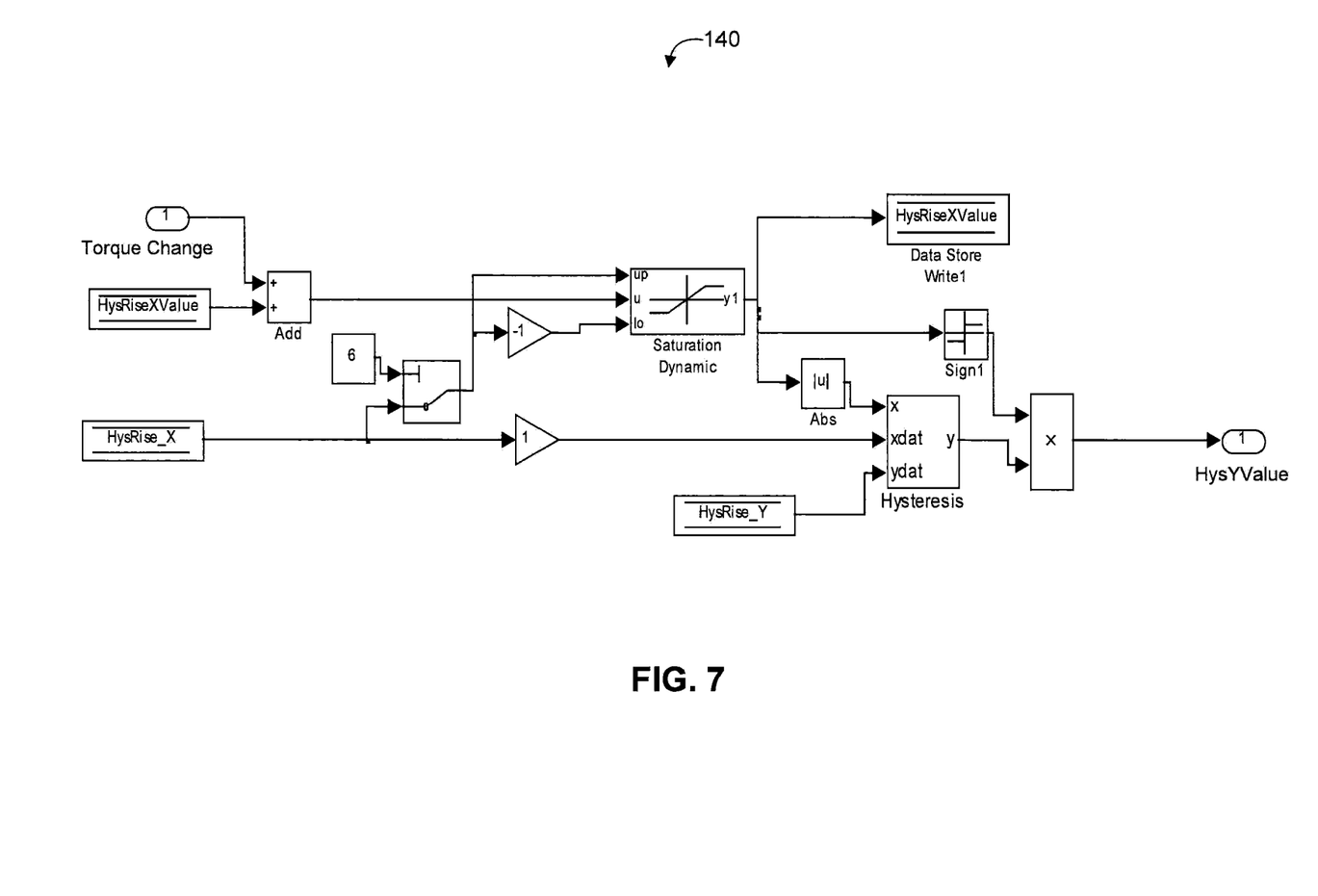
Figure 8:
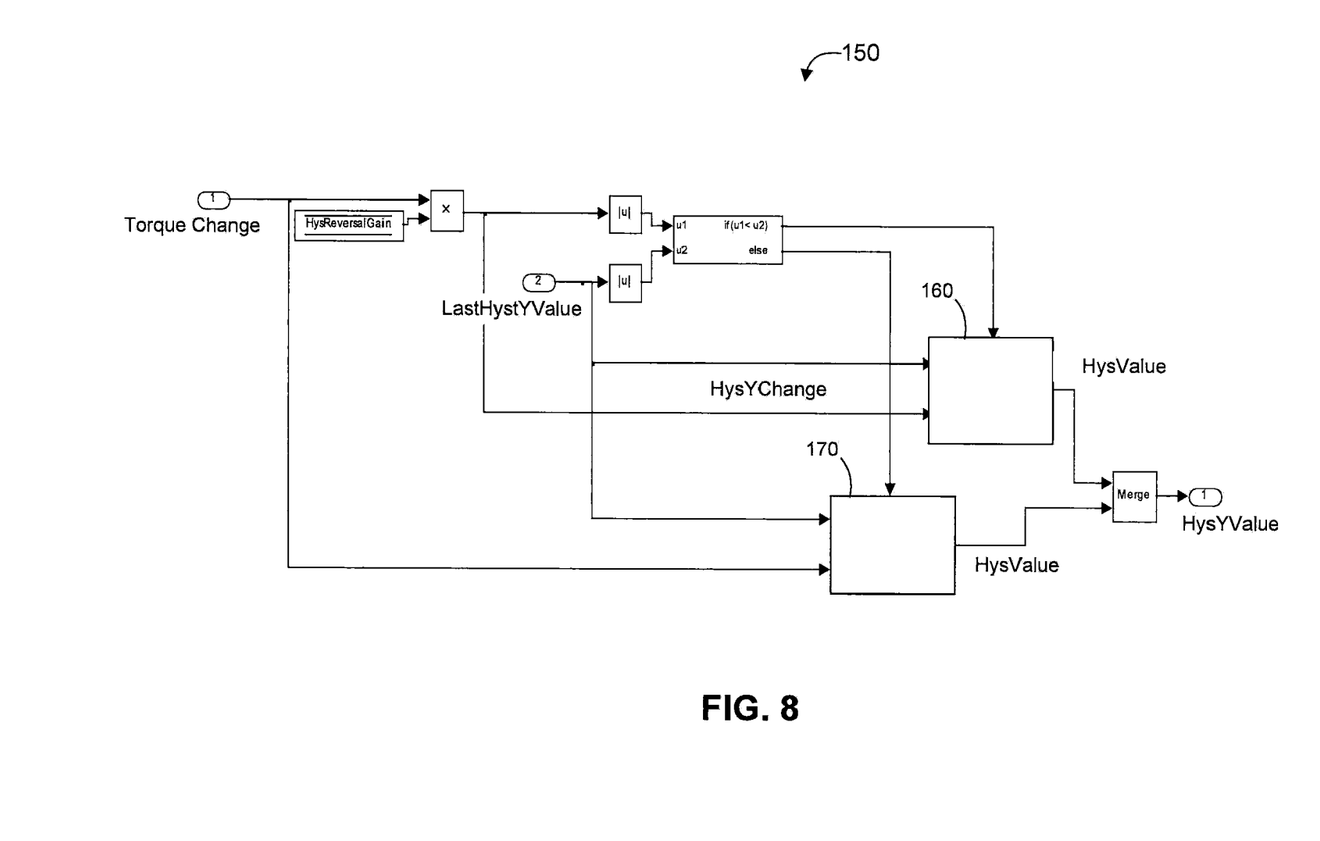
Figure 9:
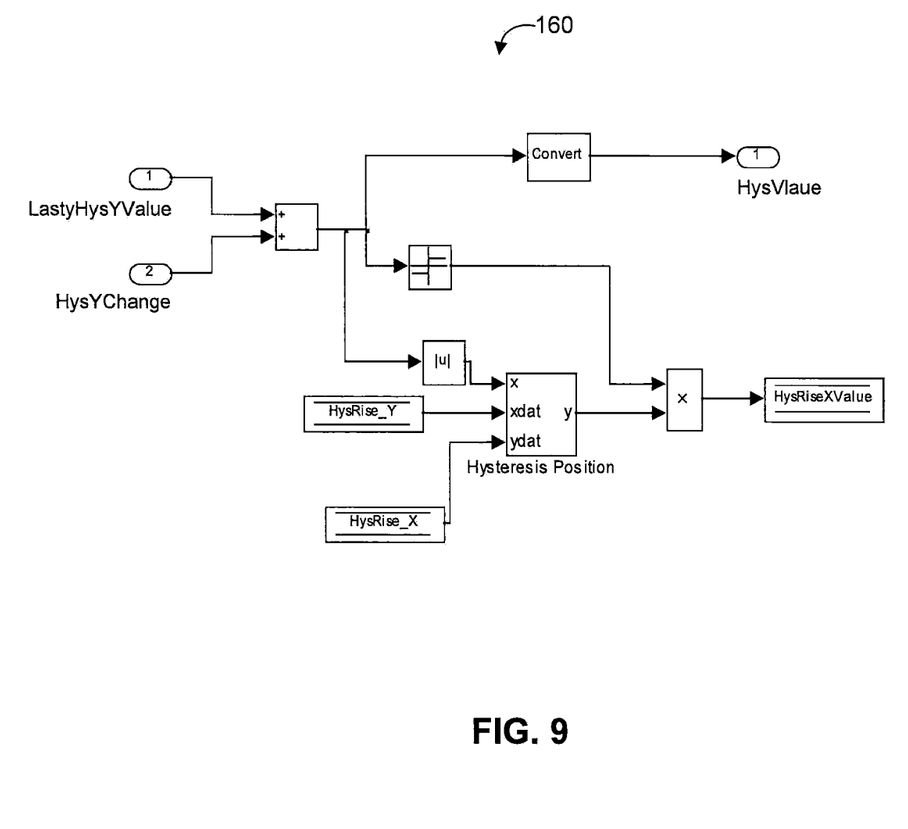

In FIGS. 3 and 6-10, when the hysteresis is non-zero, a hysteresis rise value is determined based on the hysteresis and the delta torque at 130. As shown in FIG. 6, a fraction of the available hysteresis may be computed. The fraction may then be used to determine the direction. The direction may be a same direction as the last loop at 140 or may be a different direction than the last loop at 150. If the direction is the same direction, as shown in FIG. 7, the fraction is added to a previous fraction at and a new hysteresis position is evaluated. If, however, the direction is a different direction, as shown in FIG. 8, the fraction may be divided by a predetermined value and evaluated to determine how much of a previous hysteresis has been removed. The removal may be a partial reversal or a full reversal. For example, if the amount removed is less than the last hysteresis, than the removal is a partial reversal at 160. When the removal is a partial reversal, as shown in FIG. 9, the hysteresis rise value is determined by adding the amount removed to the previous value of the hysteresis rise value. This reduces the magnitude of the hysteresis rise value because the signs of the two values being added will be different. A corresponding fraction value, which will be used for the next loop, can be determined by means of a lookup table from the new value of the hysteresis rise value.

Figure 10:
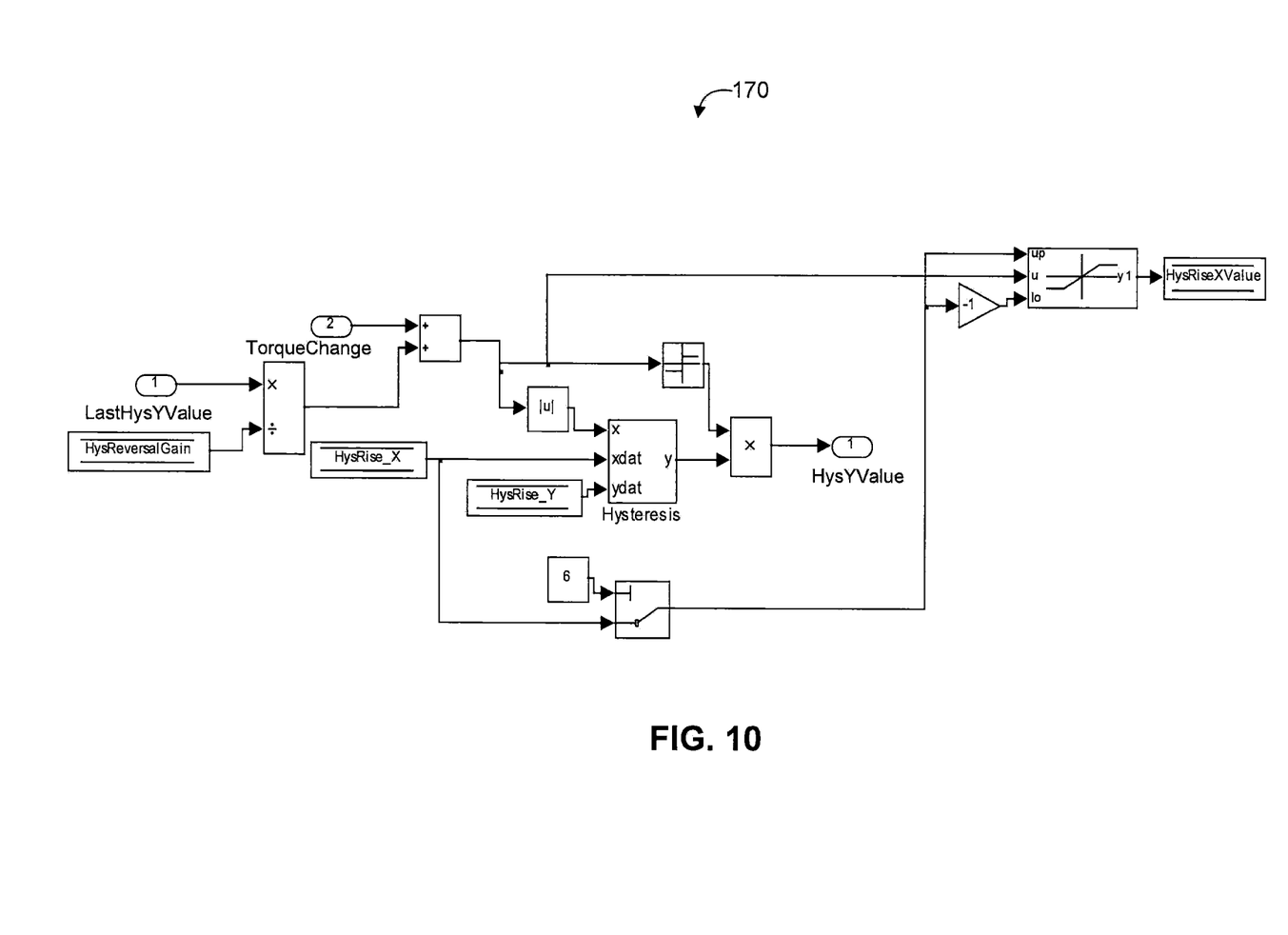

With reference back to FIG. 8, if, however, the amount removed is greater than the last hysteresis, than the removal is a full reversal at 170. For example, as shown in FIG. 10, the fraction required to completely remove the previous hyteresis rise value is computed. This is subtracted from the fraction computed from the torque change from the last loop. The remaining amount of fraction left is then used to determine a new hysteresis rise value in the opposite direction. The hysteresis position is equal to the final value of the hysteresis rise value computed which will be a value between negative one and one.

With reference back to FIG. 2, the low pass assist determination module 46 receives as input the hysteresis position 60, the low frequency torque 56, and vehicle speed 62. Based on the inputs 50, 60, 62, the low pass assist determination module 46 determines a low pass assist command 64.

Figure 11A:
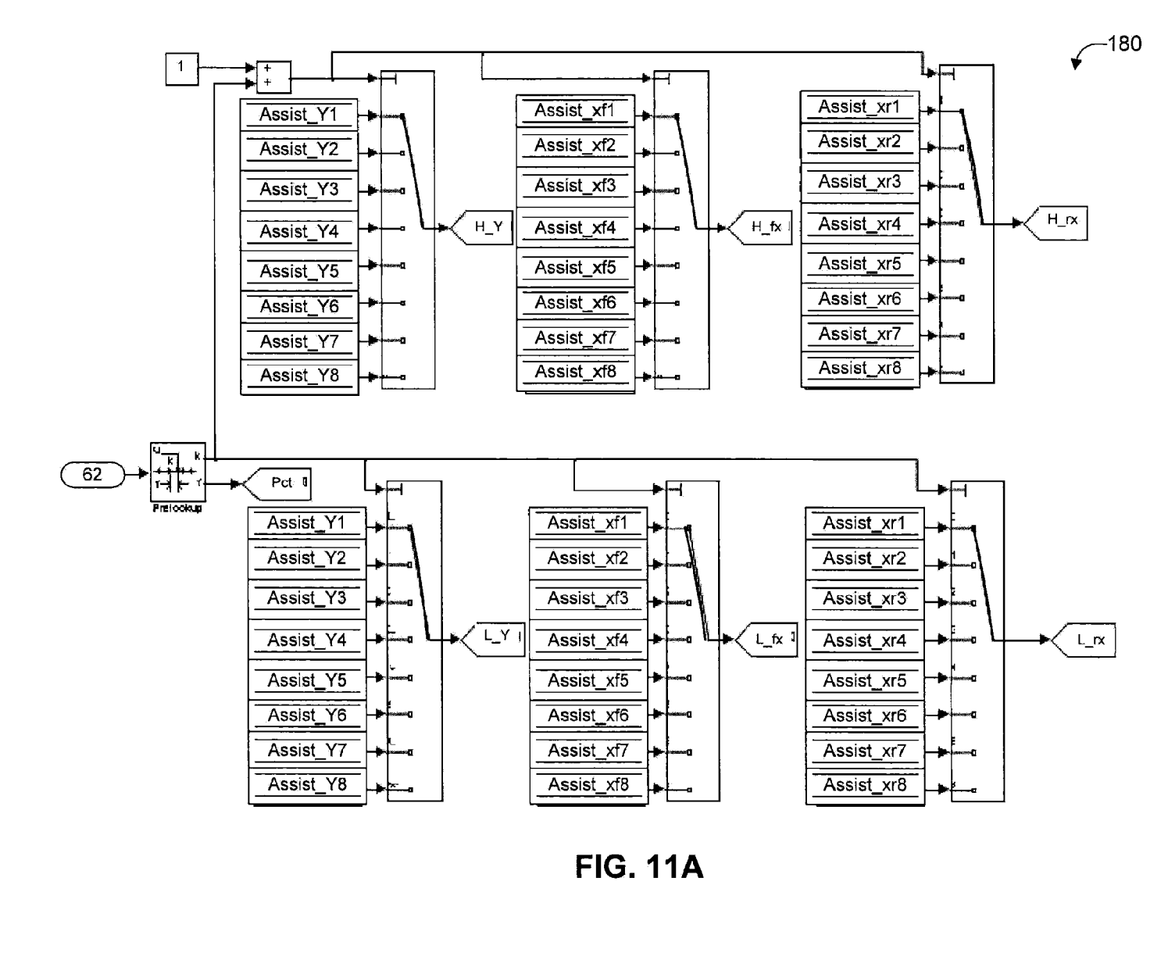
Figure 11B:
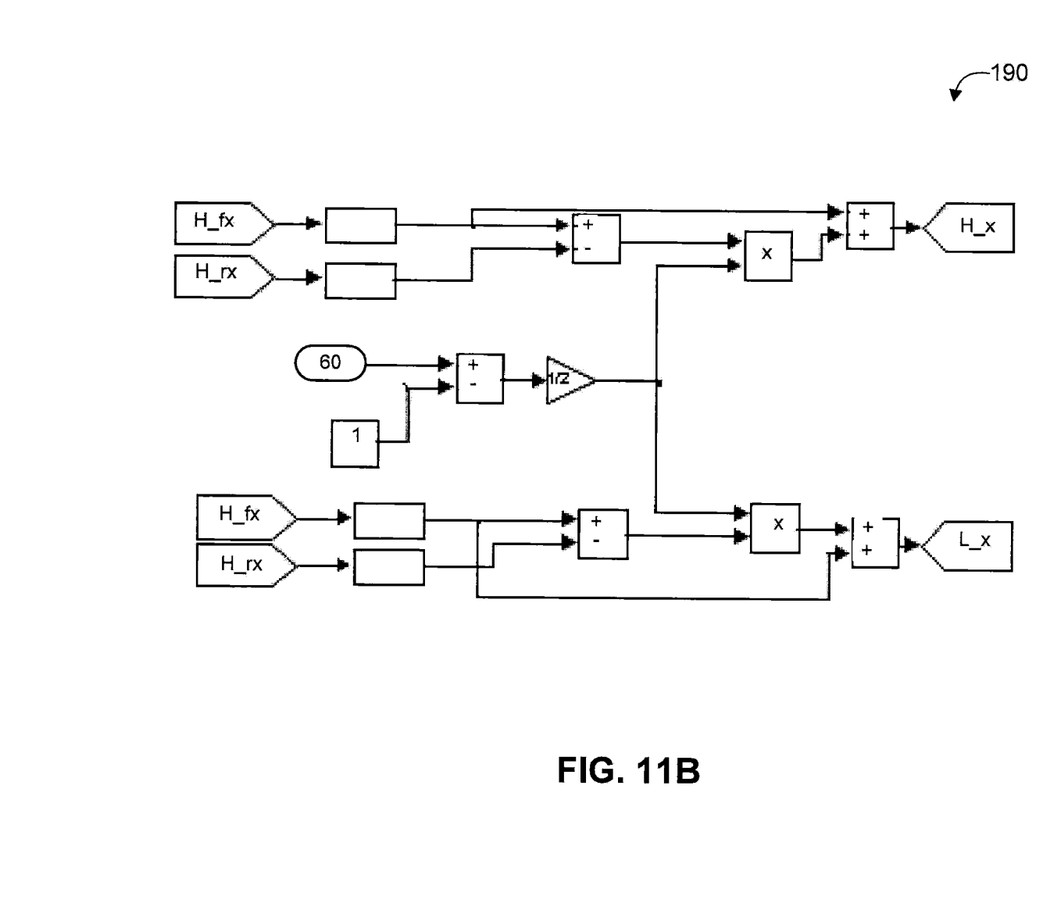
Figure 11C:
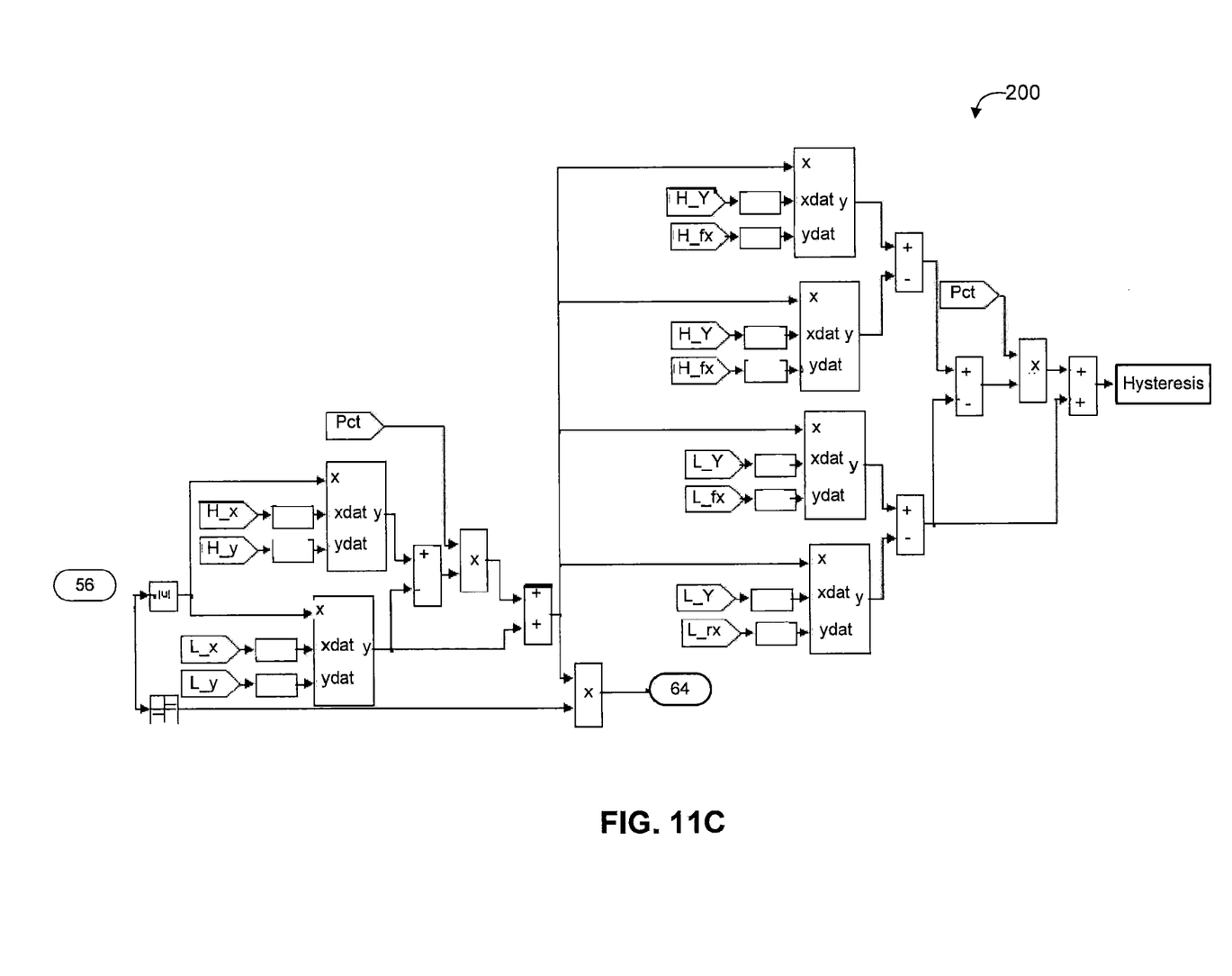

For example, as shown in FIGS. 11A-11C, the low pass assist command 64 can be determined by a series of look up tables based on vehicle speed 62. For example, for each vehicle speed for which the assist is defined, there can be three tables of data, the assist torque, the driver torque to obtain that assist when the hysteresis is fully applied in the forward direction, and the driver torque to obtain that assist when the hysteresis is fully applied in the reverse direction. Based on the vehicle speed 62, two sets of tables are selected at 180. The first set includes the tables corresponding to a speed equal to or below the vehicle speed 62. The second set includes the tables corresponding to a next index higher table which is defined above the vehicle speed 62.

A temporary low speed table and a temporary high speed table are defined at these two speeds at 190. The temporary tables are defined by applying the following formula to each value in the table:

$$\text{Temp}x = \frac{1}{2} \ast (HP-1) \ast (Xf-Xr) + Xf. \tag{1}$$

Where HP represents the hystereis position. Xf represents the driver torque table in the forward direction. Xr represents the driver torque table in the reverse hysteresis direction.

An assist level is determined at both speed conditions by using the temporary table and the assist table for that speed as a lookup table with the low frequency torque 56 as the input at 200. The low pass assist command 64 is determined by interpolating between the two assist values found, based on the actual vehicle speed 62. The available hysteresis to be used for the next loop can be determined by computing the difference between the driver torque table in the forward direction, and the driver torque table in the reverse hysteresis direction, corresponding to low pass assist value determined previously.

Figure 12A:
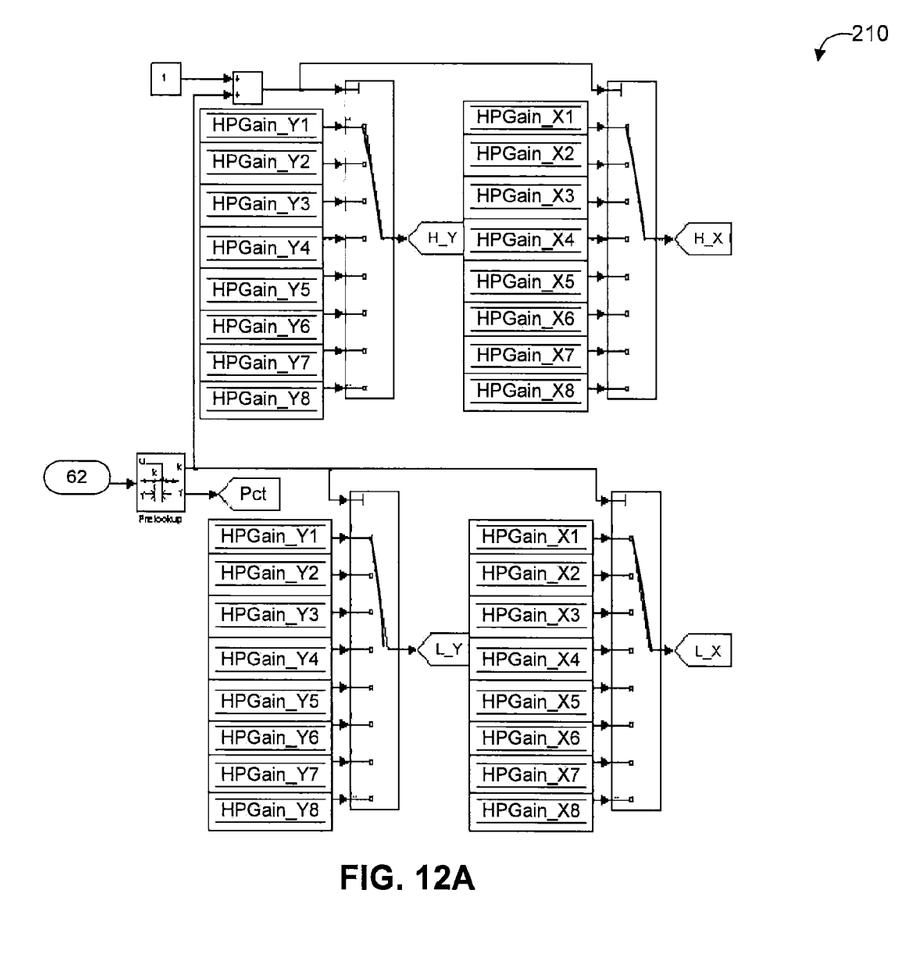

The high pass assist determination module 48 receives as input the low frequency torque 56, the high frequency torque 54, and vehicle speed 62. Based on the inputs 54, 56, 62, the high pass assist determination module 48 determines a high pass assist command 66. For example, as shown in FIG. 12A, a high pass gain can be determined by a series of look up tables based on vehicle speed 62. For example, for each vehicle speed 62 for which the high pass gain is defined, there are two tables of data, the high pass gain tables, and the index torque to obtain that gain tables. Based on the vehicle speed 62, two sets of tables are selected at 210. The first set includes the tables corresponding to a speed equal to or below the vehicle speed 62. The second set includes the tables corresponding to a next index higher table which is defined above the vehicle speed 62.

Figure 12B:
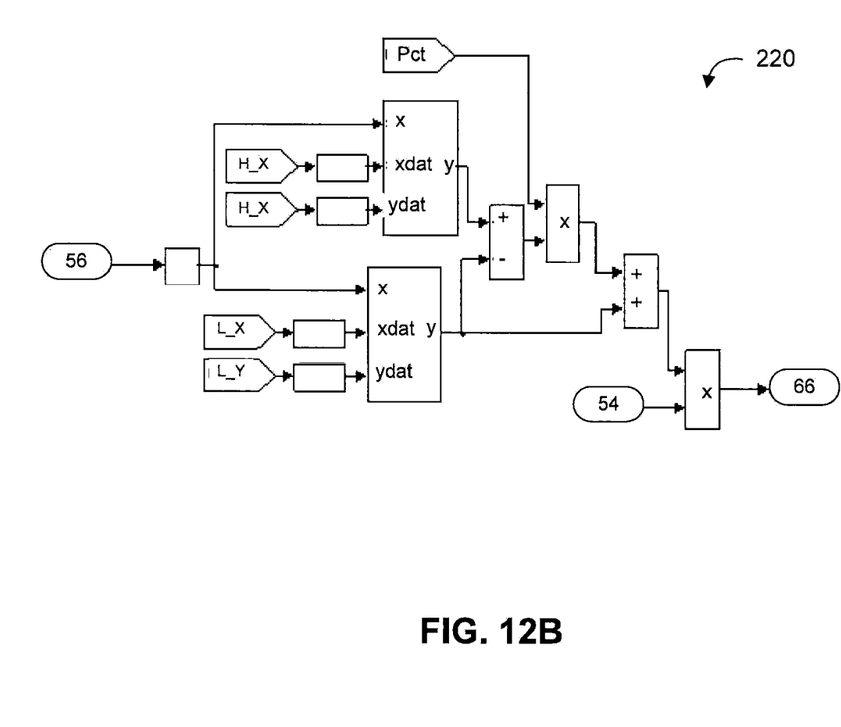

Referring to FIG. 12B, at 220, a high pass gain is determined at each speed condition by using a lookup table with an index torque as the input. The index torque, for example, can be the low pass driver torque 56. The high pass gain is determined by interpolating between the two gain values found, based on the actual vehicle speed 62. The high pass assist command 66 is determined by multiplying the high frequency torque 64 by the high pass gain.

With reference back to FIG. 2, the final assist command module 50 receives as input the high pass assist command 66 and the low pass assist command 64. Based on the inputs 64, 66, the final assist command module 50 generates a final assist command 68 to control the steering system 12 (FIG. 1). For example, the final assist command module 50 may compute a sum of the high pass assist command 66 and the low pass assist command 64 and may generate the final assist command 68 based on the sum. As can be appreciated, other methods may be performed by the final assist command module 50 to similarly generate the final assist command 68.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A control system for controlling a steering system, the control system comprising:
    a first module that receives as input handwheel velocity and handwheel torque and determines a direction of assist modification based on the handwheel torque if the handwheel velocity is below a first threshold, and the first module determines a hysteresis position based on handwheel velocity, the direction of assist modification, and handwheel torque;
    a second module that selectively determines an assist curve based on the hysteresis position; and
    a third module that generates a final assist command based on the assist curve.

2. The control system of claim 1, wherein the first module determines the direction based on handwheel velocity when the handwheel velocity is above a second threshold.

3. The control system of claim 2, wherein the first module determines the direction based on a blending method when the handwheel velocity is between the first threshold and the second threshold.

4. The control system of claim 1, wherein the first module converts the handwheel velocity to a torque value.

5. The control system of claim 1, wherein the third module generates the final assist command based on at least one of an upper limit and a lower limit on the assist curve.

6. A method of controlling a steering system, the method comprising:
    receiving handwheel velocity and handwheel torque by a first module;
    determining a direction of assist modification based on the handwheel torque if the handwheel velocity is below a first threshold by the first module;
    determining a hysteresis position based on handwheel velocity, the direction of assist modification, and handwheel torque by the first module;
    selectively determining an assist curve based on the hysteresis position by a second module; and
    generating a final assist command to the steering system based on the assist curve by a third module.

7. The method of claim 6, wherein determining the direction is based on handwheel velocity when the handwheel velocity is above a second threshold.

8. The method of claim 7, wherein determining the direction is based on a blending method when the handwheel velocity is between the first threshold and the second threshold.

9. The method of claim 6, further comprising converting the handwheel velocity to a torque value.

10. The method of claim 6, wherein generating the final assist command is based on at least one of an upper limit and a lower limit on the assist curve.

11. A system in a vehicle, comprising:
    an electric power steering system; and
    a control module that receives as input handwheel velocity and handwheel torque and determines a direction of assist modification based on the handwheel torque if the handwheel velocity is below a first threshold, that determines a hysteresis position based on handwheel velocity, the direction of assist modification, and handwheel torque, that selectively determines an assist curve based on the hysteresis position, and that generates a final assist command based on the assist curve.

12. The system of claim 11, wherein the control module determines the direction based on handwheel velocity when the handwheel velocity is above a second threshold.

13. The system of claim 12, wherein the control module determines the direction based on a blending method when the handwheel velocity is between the first threshold and the second threshold.

14. The system of claim 11, wherein the control module converts the handwheel velocity to a torque value.

15. A method of controlling a steering system, the method comprising:
    receiving handwheel velocity and handwheel torque by a first module;
    determining a direction of assist modification, the direction of assist modification based on the handwheel torque if the handwheel velocity is below a first threshold, the direction of assist modification based on based on the handwheel velocity if the handwheel velocity is above a second threshold, and the direction of assist modification based on a blending method if the handwheel velocity is between the first threshold and the second threshold; and
    determining a hysteresis position based on handwheel velocity, the direction of assist modification, and handwheel torque by the first module.

* * * * *